Dec. 29, 1931.   O. KÖHLER   1,838,557
DRIVING MECHANISM FOR POWER DRIVEN VEHICLES
Filed April 23, 1930
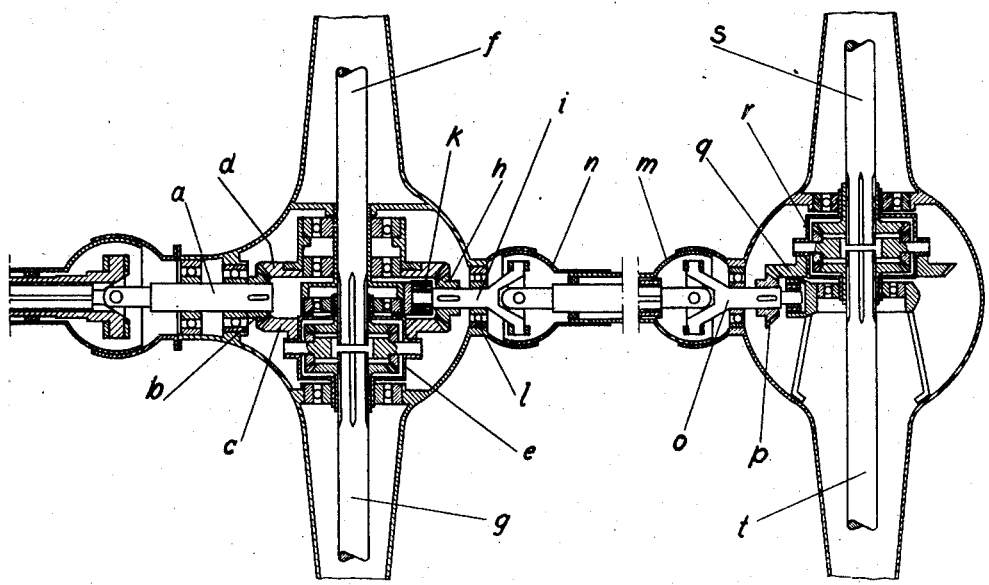
Inventor:
Otto Köhler
By: Marks & Clerk
Attys.

Patented Dec. 29, 1931

1,838,557

UNITED STATES PATENT OFFICE

OTTO KÖHLER, OF STUTTGART-UNTERTURKHEIM, GERMANY, ASSIGNOR TO DAIMLER-BENZ AKTIENGESELLSCHAFT, OF STUTTGART-UNTERTURKHEIM, GERMANY, A COMPANY OF GERMANY

DRIVING MECHANISM FOR POWER DRIVEN VEHICLES

Application filed April 23, 1930, Serial No. 446,701, and in Germany April 30, 1929.

In power-driven vehicles having more than one driven rear axle, the difficulty arises of so choosing the distance between the joints of the intermediate shaft that the angle of deviation of the joints lies within the limits where no excessive wear occurs. Owing to the small distance between the driving axles, it has hitherto not been possible, when bevel wheels are used, to reach the desired end of diminishing the angle of deviation of the Cardan joint. It was therefore necessary to use a worm gear, with its unfavorable efficiency, in place of bevel gearing. The worm gear renders it possible to make the connecting rods between the Cardan joints of such a length that the angle of deviation of the joints is not too great.

The problem of making the intermediate shafts of such a length that the angle of deviation of the Cardan joint remains within the permissible limits, while using bevel gearing, is solved by the invention.

The invention mainly consists in this that the bevel wheel fixed on the driving shaft engages with two bevel wheels mounted on the shafts of a pair of driving road wheels. Of these bevel wheels, one serves for driving the corresponding pair of driving road wheels, while both engage with the bevel wheel serving to drive the rear pair of driving road wheels.

The invention may be carried into effect by connecting one of the said two bevel wheels to the differential housing of the corresponding pair of driving road wheels, and arranging the other bevel wheel, which drives the next pair of driving road wheels, freely on the driving road wheel shaft. This method of arranging the said two bevel wheels renders it possible to place the bearing of one end of the connecting shaft between the said two bevel wheels, and to arrange the differential gear at one side of the axis of the driving shafts.

Besides the above mentioned advantage of increasing the distance between the Cardan joints, the invention has also the advantage, that by duplicating the driving wheels on the more forward rear axle, the wheels need be dimensioned only for taking up the forces necessary for each axle.

In the accompanying drawing a constructional example of the invention is illustrated diagrammatically.

On the driving shaft $a$ is fixed a toothed wheel $b$ which engages with the toothed wheels $c$ and $d$. The intermediate wheel $c$ is connected to the differential housing $e$, through which the road wheel axles $f$ and $g$ are driven. The intermediate wheel $d$ is mounted freely on the axle $f$. The intermediate wheels $c$ and $d$ engage with the intermediate wheel $h$, which is mounted on the part $i$ of the shaft.

As the differential housing $e$ is arranged to one side of the middle of the driving shafts, it is possible to place the bearings $k$ and $l$ of the shaft $i$ very close to the axles $f$ and $g$. For instance, the bearing $k$ is arranged within the driving wheel $h$.

In consequence of this construction, the Cardan joints $m$ and $n$ may be set farther apart than would be possible if the differential housing were placed in line with the driving shafts. In this way it is attained that the angle of deviation of the Cardan joints remains within the permissible limits.

The part $o$ of the shaft, joined to the Cardan joint $m$ carries the intermediate wheel $p$. The latter engages with the toothed wheel $q$ which is connected to the differential housing $r$ which drives the differential shafts $s$ and $t$.

What I claim is:

1. In a power driven vehicle having a plurality of driven axles, the combination with a driving shaft and a bevel driving wheel thereon and a pair of driving axle sections, of a driven bevel wheel in engagement with said driving bevel wheel, a differential housing connected to said driven bevel wheel on the side thereof remote from the axis of the driving shaft, an intermediate shaft coaxial with said driving shaft and having a bevel actuating wheel thereon in engagement with said driven bevel wheel, a supporting bearing for said intermediate shaft interposed between said bevel actuating wheel and the said driving axle sections, and driving means for actuating a succeeding driven axle, comprising a connecting shaft, a second driving shaft for said axle and Cardan joints connected to said intermediate shaft and connecting shaft and to said connecting shaft and second driving shaft, respectively.

2. In a power driven vehicle having a plurality of driven axles, the combination as set forth in claim 1 with a second driven bevel wheel rotatable on one of the axle sections on the side of the axis of the driving shaft remote from the driven bevel wheel connected to the differential housing, said second driven wheel being in engagement with the bevel driving wheel and the bevel actuating wheel.

3. In a power driven vehicle having a plurality of driven axles, the combination with a driving shaft and a bevel driving wheel thereon and a pair of driving axle sections, of a driven bevel wheel in engagement with said driving bevel wheel, a differential housing connected to said driven bevel wheel on the side thereof remote from the axis of the driving shaft, an intermediate shaft coaxial with said driving shaft and having a bevel actuating wheel thereon in engagement with said driven bevel wheel, a supporting bearing for said intermediate shaft interposed between said bevel actuating wheel and the said driving axle sections, a second pair of axle sections, a connecting shaft, a second driving shaft having a bevel driving wheel thereon, Cardan joints connected to said intermediate and connecting shafts and to said connecting and second driving shafts respectively, a driven bevel wheel in engagement with the bevel driving wheel on said second driving shaft, a differential housing connected to said last named driven bevel wheel on the side thereof remote from the axis of the second driving shaft, and a supporting bearing for said second driving shaft interposed between the bevel driving wheel thereon and the second pair of axle sections.

In testimony whereof I affix my signature.

OTTO KÖHLER.